Dec. 11, 1934.   W. F. JENKINS   1,983,855
SHAFT SEAL
Filed Oct. 30, 1933

WILLIAM F. JENKINS
INVENTOR
By Leon T. Hooper
ATTORNEY

Patented Dec. 11, 1934

1,983,855

UNITED STATES PATENT OFFICE 1,983,855

SHAFT SEAL

William F. Jenkins, Hammond, Ind.

Application October 30, 1933, Serial No. 695,862

5 Claims. (Cl. 286—11)

This invention relates to an improved shaft seal, particularly for pumps, and is constructed entirely of metal and has for one of its principal objects the provision of means for effectively sealing rotating shafts without the use of packing.

Another and further important object of this invention resides in the provision of means for using the pressure built up within the pump for sealing.

Another and still further important object of this invention is the provision of means for keeping the interior of the extensible diaphragm free from the material pumped.

A still further important object of the shaft seal of this invention is the provision of means for confining the lubricant to the sealing surfaces of the device.

Still another and further important object of this invention is the provision of means for keeping all sealing surfaces free from the material pumped.

Another important object of the shaft seal of this invention is the fact that the device may be readily attached to the present type pumps having either split or sleeve bearings.

Other and further important objects of this invention will be apparent from the disclosures in the accompanying drawing and following specification.

The invention, in a preferred form, is illustrated in the drawing and hereinafter more fully described.

Figure 1:
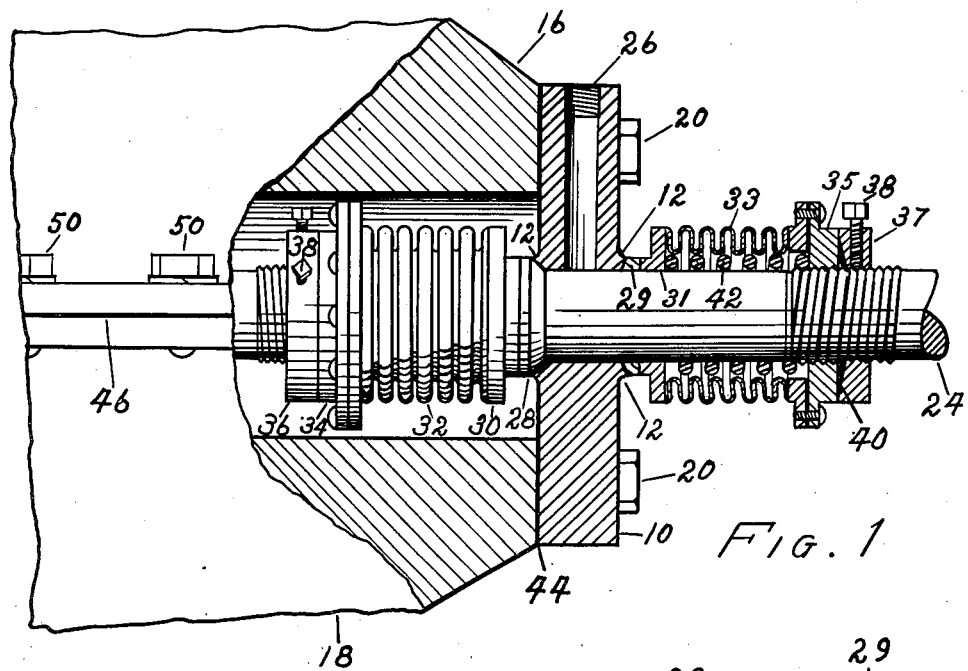
Figure 1 is a vertical view of the shaft seal of this invention in working position and is shown partly in section.
Figure 4:
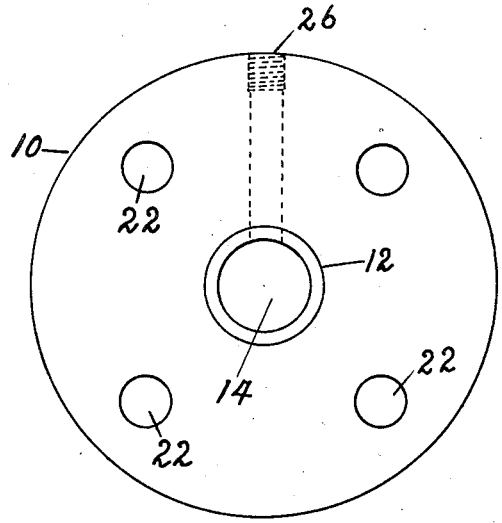
Figure 4 is a front elevation of the flange and shows the relative position of the various apertures and the lubricant passageway.

The reference numeral 10 indicates in a general way a flange which in the preferred form is faced on both sides and has a raised sealing surface 12 on each face thereof surrounding the central shaft aperture 14.

Secured to the sections of the casings 16 and 18 by bolts 20 passing through the bolt holes 22 the flange 10 forms a combination closure for the stuffing box opening and an auxiliary bearing for the shaft 24.

Extending downwardly through the flange 10 and terminating at the top of the shaft aperture 14 is a lubricant passageway 26, the upper portion of which is threaded to receive the nipple of an oil cup, or any other suitable lubricating device.

Positioned on the shaft 24 and adapted to operate within the stuffing box is the internal portion of the shaft seal which comprises a sealing ring 28, a smooth bore diaphragm closure 30, an extensible diaphragm 32, a threaded diaphragm closure 34, and a lock nut 36. These parts are assembled on the shaft in the order named and are held in adjusted position thereon by the lock nut 36 co-operating with the threaded portion of the shaft as shown in Figure 1 of the drawing. Set screws 38 are employed to secure the lock nut as desired. The face of the lock nut contacting the closure 34 is preferably concave to receive a lead or other soft metal washer 40, to prevent leakage.

Positioned on the outwardly extending portion of the shaft 24 is the external portion of the sealing device which consists of a sealing ring 29, a smooth bore diaphragm closure 31, an extensible diaphragm 33, a threaded diaphragm closure 35, and a lock nut 37.

These parts are duplicates of the members comprising the internal portion of the shaft seal with the exception that the outer portion is positioned on a left hand thread and the internal portion on a right hand thread.

In the preferred embodiment of this invention the diaphragms are secured to the closures by means of soldering, brazing or any other suitable method. However, to insure operations under certain conditions, as for instance, where material heated above the melting point of solder is handled, the securing means shown in Figure 5 are used to fasten the diaphragms to the closures.

Figure 5:
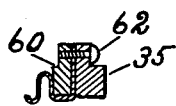
Figure 5 is a sectional view of the closure diaphragm joint with parts broken away and shows a slight modification in the manner of securing the closure to the diaphragm.

The modication of the closure securing means shown in Figure 5 consists of a ring 60, having a plurality of regularly spaced threaded holes therein to receive and co-act with the threaded portions of the screws 62, and a threaded closure 35 having holes corresponding to the threaded holes in the ring 60. The ring is placed on one side of the outwardly turned end of the diaphragm and the closure on the other side, the whole being then secured in position by the screws 62. This means of securing the diaphragm to the closures makes a gas tight seal not affected by heat.

Positioned within the diaphragms 32 and 33, and encircling the shaft 24, are helical springs 42 as shown in the broken away outer portion of the device in Figure 1. Suitable gaskets 44 and 46 are used between stationary parts to insure gas tight joints.

The helical spring 42 shown within the diaphragm 33, for maintaining a constant pressure on the sealing ring 29 may, where occasion suggests, be placed on the outside of the diaphragm.

While the drawing illustrates the shaft seal in position on a casing comprising upper and lower portions secured together by bolts 50, which is the customary construction in multi-phase and high pressure pumps, it will be obvious that the device will function equally well in other pumps using a one piece side or a sleeve bearing.

Figures 2, 3:
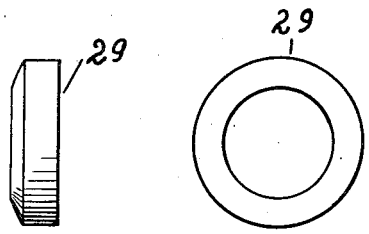
Figure 2 is a slightly enlarged view of the free sealing ring.
Figure 3 is a front view of the enlarged free sealing ring shown in Figure 2.

The enlarged sealing ring 29 shown in Figures 2 and 3 has one convex face and one flat face which is the preferred construction. This construction permits limited longitudinal rocking of the shaft 24 without breaking the seal. However, these working surfaces of the ring, together with the sealing surfaces of the flange 10, may be varied to suit any particular set-up or desire.

It will be apparent from the foregoing disclosures that the sealing rings are not fixed, but are independently movable either rotatably or longitudinally of the shaft. This construction reduces friction, provides a plurality of surfaces to assimilate wear and thus greatly extends the period of effectiveness and reduces operating costs.

Furthermore, because of the novel construction of the shaft seal of this invention, it may be used in safety for handling such materials as milk, or any other edible product without danger of contamination by the lubricant used.

Due to the novel construction of the shaft seal of this invention, all material passed through the pump contacts only the outer surface of the sealing device which is easily cleaned. Because of the novel construction and assembly of the inner portion of this shaft seal it will be apparent that any pressure built up within the pump casing must extend into the chamber surrounding the inner portion of the shaft seal and as such pressure expands the diaphragm longitudinally, it therefore becomes a medium for assisting in maintaining a gas tight seal between the sealing ring and the flange.

Moreover, because a part of the shaft seal of this invention is positioned on each side of the fixed flange, the external part acts as an auxiliary seal in case of failure of the internal part.

I am aware that many changes may be made and numerous details of construction varied throughout a wide range without departing from the principles of this invention and I, therefore, do not purpose limiting the patent granted hereon otherwise than as necessitated by the prior art.

I claim as my invention:

1. A shaft seal capable of being positioned on the outwardly extending portion of a shaft, comprising a relatively fixed reversible fitting having a concave working surface on each face thereof, metal diaphragms encircling the shaft and rotatable therewith, closures on each end of each diaphragm, a sealing ring freely rotatable and slidable on the shaft on each side of said fitting, one surface of each ring co-acting with a concave working surface of the fitting and the other surface co-acting with one of the closures to form a gas-tight seal, and means for maintaining an adjusted pressure on the rings and their bearing on the shaft, said means including a spring within each metal diaphragm.

2. A shaft seal comprising the combination of a casing, a reversible flange removably secured to the external surface of said casing, a shaft passing through said flange, a faced surface on each side of said flange, gas-tight diaphragms adjustably secured to the shaft and rotatable therewith on each side of the flange, independently movable sealing rings encircling the shaft between the flange and each diaphragm and having sealing contact with said flange and said diaphragms, means for conveying a lubricant from the flange to each of said sealing rings and diaphragms, and spring means associated with each diaphragm for maintaining a constant pressure against the flange.

3. An external shaft seal comprising a relatively fixed reversible fitting capable of being positioned on the outer surface of a pump casing and having a passage for lubricant therein, a shaft extending through said casing and said fitting, a metal diaphragm secured to and encircling the shaft on each side of said fitting, closures on each end of said diaphragms, a sealing ring encircling the shaft between said fitting and each of said diaphragms, said rings being rotatably and slidably free on said shaft, one surface of each ring co-acting with said fixed fitting and the other surface co-acting with one of the closures on said diaphragm to form a gas-tight seal, means for maintaining an adjusted pressure on the rings and their bearing on the shaft, said means including a helical spring within each diaphragm, means whereby the spring may be removed at will and means whereby the interior of the diaphragms may be visually inspected and cleaned without removal of said diaphragms from the shaft, and means for passing lubricant from the fitting into and through the sealing rings, and to the bearing surfaces of said rings.

4. An externally mounted shaft seal comprising a casing, a shaft extending through said casing, a relatively fixed fitting encircling said shaft and capable of being secured with either face to the casing and having a passage for lubricant therein, a metal diaphragm on each side of said fitting, closures on the ends of each diaphragm, a freely rotatable and slidable sealing ring on the shaft on each side of the fitting between one closure and said fitting, and means for maintaining an adjusted pressure on each ring and its bearing on the shaft, said means including a helical spring within the expansible diaphragm.

5. An external shaft seal comprising a casing, a relatively fixed fitting secured to the casing, said fitting having a passage for lubricant therein, the outer portion of the faces of said fitting being adapted for securing to the casing, the inner portion of said faces forming a working surface for a seal, metal diaphragms, closures on each end thereof, freely rotatable and slidable sealing rings on the shaft, said rings being accessible for regrinding in position, said rings being positioned between one closure and the fixed fitting, and means for maintaining an adjusted spring pressure on the rings and their bearings on the shaft, said means including a helical spring encircling the shaft within each expansible diaphragm, together with means for mounting the diaphragm on the shaft, said latter means including a screw threaded portion of the shaft, and adjustable and lockable screw threaded gas-tight connection between the shaft and the removable closure at the end of the diaphragm.

WILLIAM F. JENKINS.